United States Patent
Lundgren

(10) Patent No.: US 9,656,406 B2
(45) Date of Patent: May 23, 2017

(54) ARRANGEMENT FOR THE PASSIVE CAPTURE OF A BROKEN SAW CHAIN

(71) Applicant: Komatsu Forest AB, Umeå (SE)

(72) Inventor: Karl Lundgren, Umeå (SE)

(73) Assignee: KOMATSU FOREST AB, Umeå (SE)

( * ) Notice: Subject to any disclaimer, the term of this patent is extended or adjusted under 35 U.S.C. 154(b) by 0 days.

(21) Appl. No.: 14/651,584

(22) PCT Filed: Dec. 5, 2013

(86) PCT No.: PCT/SE2013/051457
§ 371 (c)(1),
(2) Date: Jun. 11, 2015

(87) PCT Pub. No.: WO2014/092632
PCT Pub. Date: Jun. 19, 2014

(65) Prior Publication Data
US 2015/0314470 A1    Nov. 5, 2015

(30) Foreign Application Priority Data

Dec. 13, 2012  (SE) .................................... 12514147

(51) Int. Cl.
*B27G 19/00* (2006.01)
*A01G 23/091* (2006.01)
*B27B 17/00* (2006.01)

(52) U.S. Cl.
CPC ......... *B27G 19/003* (2013.01); *A01G 23/091* (2013.01); *B27B 17/00* (2013.01)

(58) Field of Classification Search
CPC .... B27G 19/00; B27G 19/003; A01G 23/091; B27B 17/08; B27B 33/14

(Continued)

(56) References Cited

U.S. PATENT DOCUMENTS 2,879,814 A * 3/1959 Scott .................... B27B 17/0016
30/122
3,496,971 A    2/1970 Fred
(Continued)

FOREIGN PATENT DOCUMENTS

DE    4137187 A1    5/1992
EP    1528852 B1    4/2006
(Continued)

OTHER PUBLICATIONS

International Search Report received for PCT Patent Application No. PCT/SE2013/051457, mailed on Mar. 25, 2014, 5 pages.
(Continued)

*Primary Examiner* — Jason Daniel Prone
(74) *Attorney, Agent, or Firm* — Morrison & Foerster LLP

(57) ABSTRACT

An arrangement to capture passively a broken saw chain of a chain saw with a guide bar that is arranged such that it can pivot, including a stationary screen that forms part of a sawing box and that covers a rear part of the saw. In order to achieve an inexpensive and efficient protection there is arranged between an end surface of the screen and the guide bar an energy-absorbing brake member that is sufficiently elastic or flexible to receive the kinetic energy from a broken saw chain, to direct kinetic energy away from the chain and to regain its normal form after it has suffered an impact from and been deformed by the chain.

12 Claims, 2 Drawing Sheets

(58) Field of Classification Search
USPC ........... 144/4.1, 34.1, 335–338; 30/378–387, 30/122
See application file for complete search history.

(56) References Cited

U.S. PATENT DOCUMENTS

| | | | | |
|---|---|---|---|---|
| 3,565,138 A * | 2/1971 | Albright | ............... | A01G 23/091 144/34.1 |
| 3,672,412 A * | 6/1972 | Albright | ................ | A01G 23/08 144/4.1 |
| 4,272,889 A * | 6/1981 | Scott | ........................ | B27B 17/00 30/122 |
| 4,649,644 A * | 3/1987 | Huddleston | ........ | B23D 57/0076 30/122 |
| 5,987,786 A * | 11/1999 | Gibson | ................ | A01G 23/091 144/34.1 |
| 6,148,547 A * | 11/2000 | Seigneur | ............. | A01G 23/091 144/34.1 |
| 6,397,452 B1 * | 6/2002 | Frosberg | ................ | A01G 23/06 144/34.1 |
| 6,976,299 B2 * | 12/2005 | Seigneur | ................ | B27B 17/02 30/383 |
| 7,334,611 B2 * | 2/2008 | Hyvonen | ............. | A01G 23/091 144/34.1 |
| 7,690,407 B2 * | 4/2010 | Annala | ................ | A01G 23/091 144/4.1 |
| 8,499,463 B2 * | 8/2013 | Arvidsson | ............... | B27B 17/08 30/382 |
| 2010/0088904 A1 * | 4/2010 | Arvidsson | ............ | B27G 19/003 30/382 |
| 2011/0088816 A1 * | 4/2011 | Arvidsson | ............ | A01G 23/099 144/4.1 |
| 2011/0265912 A1 * | 11/2011 | Arvidsson | ............ | A01G 23/083 144/24.13 |
| 2014/0305273 A1 * | 10/2014 | Thomsen | ............. | B27G 19/003 83/814 |
| 2015/0089820 A1 * | 4/2015 | Sorell | ..................... | B27B 17/02 30/383 |

FOREIGN PATENT DOCUMENTS

| | | |
|---|---|---|
| SE | 517665 C2 | 7/2002 |
| WO | 02/071833 A1 | 9/2002 |
| WO | WO 02071833 A1 * | 9/2002 |
| WO | 2008/088284 A1 | 7/2008 |
| WO | WO 2014092632 A1 * | 6/2014 |

OTHER PUBLICATIONS

International Preliminary Report on Patentability received for PCT Patent Application No. PCT/SE2013/051457, mailed on Jun. 25, 2015, 8 pages.

International Written Opinion received for PCT Patent Application No. PCT/SE2013/051457, mailed on Mar. 25, 2014, 6 pages.

* cited by examiner

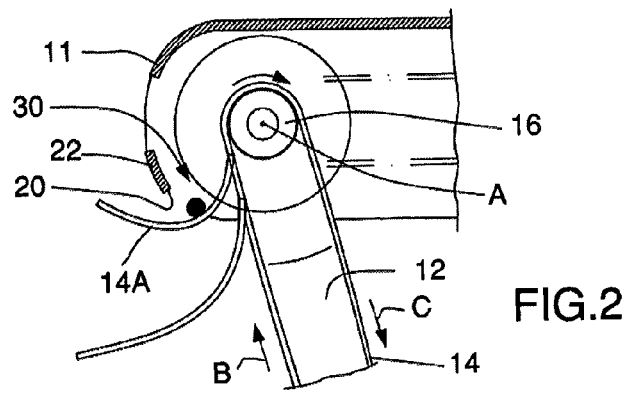
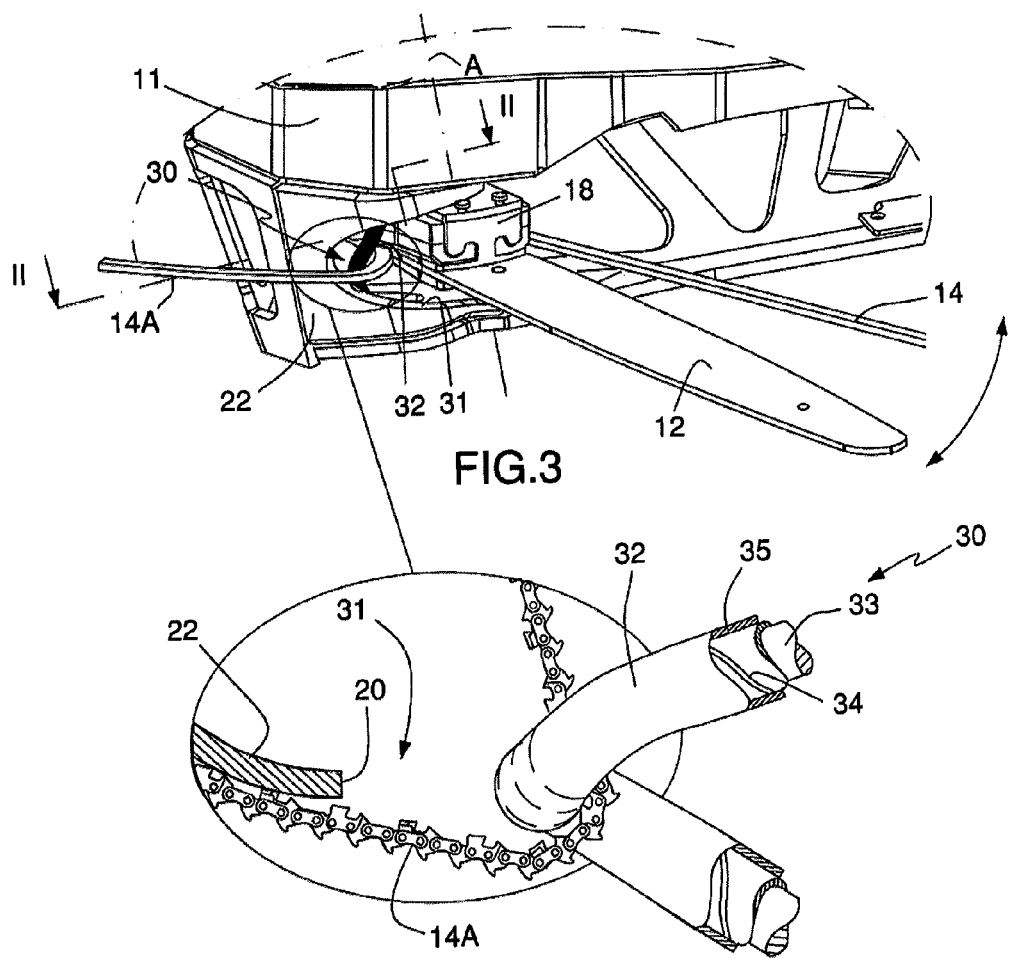

ARRANGEMENT FOR THE PASSIVE CAPTURE OF A BROKEN SAW CHAIN

CROSS REFERENCE TO RELATED APPLICATIONS

This application is a U.S. National Stage patent application of PCT/SE2013/051457, filed on Dec. 5, 2013, which claims priority to Swedish Patent Application No. 1251414-7, filed on Dec. 13, 2012, the entire contents of which are incorporated herein by reference.

FIELD OF THE INVENTION

The present invention concerns an arrangement for the passive capture of a broken saw chain. The invention concerns also a tree harvester.

BACKGROUND OF THE INVENTION

Saw chains of chain saws mounted at harvesters of the single-grip type for the felling and processing of tree trunks often run with large peripheral speeds around the guide bar. The saw arrangement that carries out the sawing is mounted in the protection of a shielded sawing box. A conventional saw arrangement comprises a frame, a saw motor, a driving wheel, a guide bar, a saw chain, a holder for the guide bar and an element to feed the guide bar out of and into the sawing box. The saw motor is arranged to drive the driving wheel and to rotate the saw chain around the guide bar that can pivot during the sawing operation. The guide bar is so located in the sawing box that its pathway of motion is not obstructed by the sawing box. The sawing box is provided with openings that allow sawdust to leave the box.

A dangerous situation that can arise during sawing is breakage of the saw chain. Situations have arisen in which various parts have become loose from the broken chain and been thrown out at high speed as projectiles. A chain breakage in which parts are thrown out is generally known as a "chain shot". The breakage of the chain is caused principally in that a part of the broken saw chain is thrown backwards and is cut off, cut or split due to the sudden whiplash effect that the chain part exerts against some end surface in openings in the protective parts of the sawing box. The parts that are thrown out can include saw teeth, side links, driving links and other parts. Such parts that fly out into the surroundings can cause dangerous situations, in particular if people or other work machines are located in the vicinity of the chain shot. At a work location with several harvesters that work at the same time it is not always possible to ensure a minimum safety distance.

In order to reduce the problem of chain shots, saw arrangements with various types of chain shot protection have been suggested. One known chain shot protection that is revealed by EP 1,528,852 C has a protective wall that carries out an active pivoting motion together with the guide bar at its rear part. A passive arrangement is known from SE 530,792 C2 that, instead of protecting against parts from a split chain, ensures as far as possible that a broken chain does not break into parts. In order to achieve this, the sawing box is equipped with a screen that has an end surface that has been given a convex curvature with a sufficiently large radius and such a hardness that a part of the broken saw chain is not cut off or split on contact with the end surface, but can slide around the end surface essentially unhindered. Due to the large radius, the arrangement demonstrates a lack of any sharp edges against which the chain can be split. Due to the hard surface, the links of the chain do not cut into the material and are not thus broken off. A timber working head for the cutting of tree trunks is known from SE 517,665. In order to prevent parts from a broken saw chain being thrown out, the sawing box is provided at its rear end edge with a shielding wall that carries out an active pivoting motion together with the guide bar. In one execution, the actively displaceable shielding wall may be manufactured from an elastic flexible material such as rubber. The shielding wall is pivoted by means of a turning motor that works synchronously with the guide bar during its pivoting motion during a cutting operation. The term "passive protection" is used to denote such protection as is mounted stationary in the sawing box.

Each one of the arrangements described above has been shown to function well and has probably resulted in that it has been possible to avoid serious accidents. It should, however, be understood that tree harvesters are advanced units that are subject to heavy effects when working from impacts and collisions, and also from contaminants such as dirt, dust and sawdust that circulate in the air around the timber working head. Mechanisms that are components of the tree harvester can often be affected by disturbances, which lead to unnecessary interruptions in operation. It is, therefore, desirable to minimise as far as is possible the number of mechanisms, and in particular motor-driven mechanisms, that are components of the timber working head, which is in itself already very complex. In particular, with respect to the passive arrangement that is revealed by SE 530,792 C2, the extra saw protection mentioned in the introduction at the actively pivoting saw mechanism is unnecessary.

There is, however, always an aspiration to improve and modify protective arrangements of this type with the aim of achieving both cheaper and more efficient protection.

SUMMARY OF THE INVENTION

One purpose of the present invention is to achieve a protective arrangement of the passive type that is both cheaper and more efficient than currently known protective arrangements of corresponding type. A second purpose of the invention is to achieve a tree harvester that demonstrates an improved and more efficient protection against chain shot.

These purposes of the invention are achieved through an energy-absorbing protective arrangement that demonstrates the distinctive features and characteristics that are explained below and a tree harvester of the type that is explained below.

According to one examination of the invention, an energy-absorbing brake means that is mounted stationary in the rear part of the sawing box and that is sufficiently elastic or flexible to receive the kinetic energy from a part of a broken saw chain is used to direct away kinetic energy from the saw chain and to regain its normal form after having suffered an impact from and been deformed by a part of a broken saw chain. In one execution, a rear screen of the sawing box is provided with an indentation, in the opening of which is arranged an extended energy-absorbing element in the form of a flexible element such as a wire, chain, thread, rope, tape, or similar. In a second execution, the flexible element is constituted by an elastic element, an elastic line that is fixed at its ends and that cuts the opening in such a manner that it can capture and receive a broken saw chain in a flexible manner. When the elastic element suffers an impact from the saw chain it is bent backwards in a U-shaped curve. The elastic element is arranged to offer a braking force during the complete capture manoeuvre that can be progressive and that in this way undergoes a transition to become larger with increasing bending of the elastic element. Since the elastic element lacks mechanical moving parts and driving means, which means that it can be regarded as essentially passive, water, dirt and lubricants do not have any significant influence on the energy-absorbing properties of the elastic element.

BRIEF DESCRIPTION OF THE DRAWINGS

The present invention will be described below in more detail with reference to embodiments that are shown in the attached drawings, of which:

FIG. 1 shows schematically in an enlargement of detail a partly cut away rear part of a screen that is a component of the saw arrangement in which a safety arrangement according to the invention with the ability to receive the kinetic energy from a part of a broken saw chain is arranged;

FIG. 2 shows a longitudinal section through a rear part of a saw arrangement viewed along the line II-II in FIG. 3, in a condition in which the kinetic energy from a broken chain has been captured by a safety arrangement according to the invention;

FIG. 3 shows a schematic perspective view of a partly cut away rear part of a saw arrangement with partly cut away parts in a condition in which the kinetic energy from a broken chain is captured by a safety arrangement according to the invention;

FIG. 3 shows schematically in an enlargement of detail a safety arrangement according to the invention illustrating a chain break of a saw chain and how it is captured by an elastic line.

DETAILED DESCRIPTION OF THE INVENTION

Figure 1:
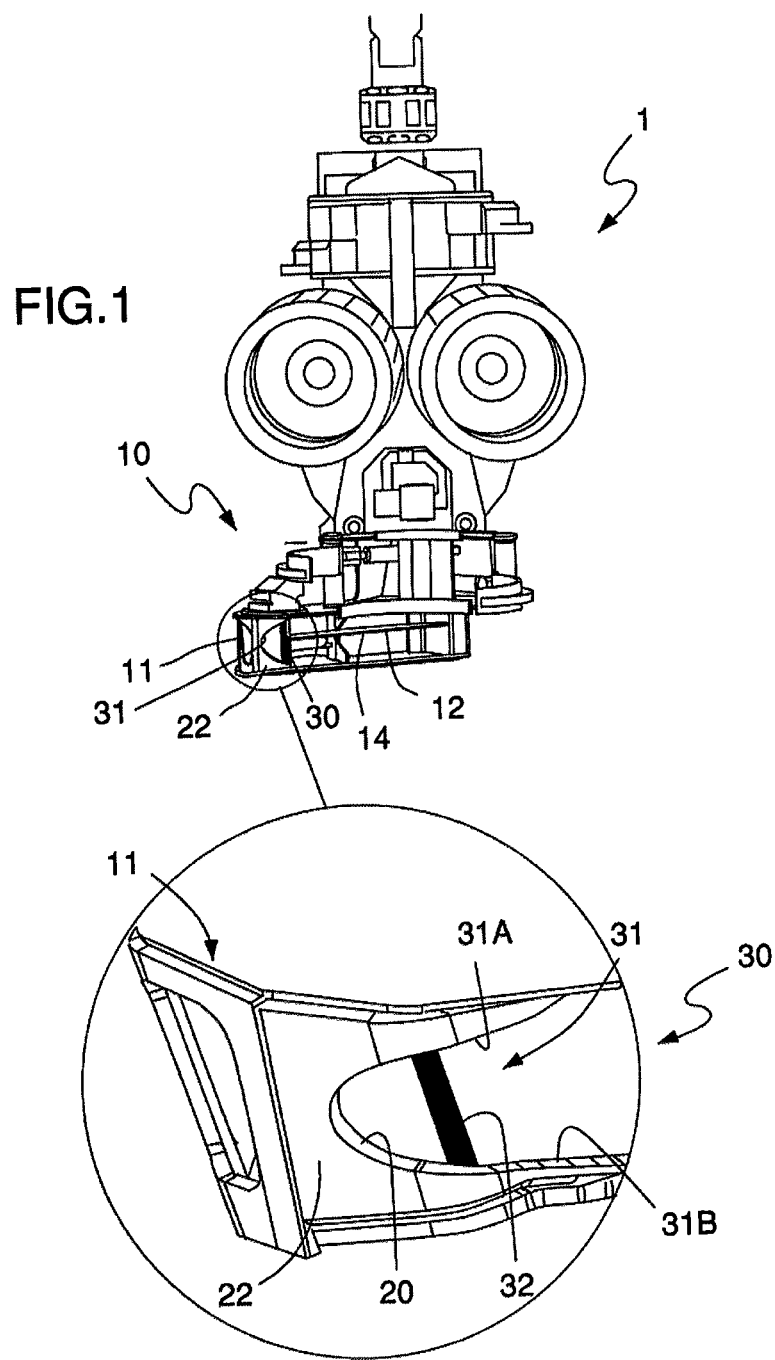
FIG. 1 shows a view from the front of a tree harvester provided with a saw arrangement for the cutting of a tree trunk, which saw arrangement is equipped with a safety arrangement to capture a broken saw chain according to the present invention.

A tree harvester 1 of a common type is shown in FIG. 1 provided with a safety arrangement according to the present invention. The tree harvester 1 has at what is its lower part in the drawing a chain saw 10 that is housed within a sawing box 11. The chain saw 10 has a guide bar 12 around which runs a saw chain 14. The saw chain 14 is driven around the guide bar 12 by a drive or a driving wheel 16 by a motor, not shown in the drawings, located in a rear part of the sawing box 11. During a cutting operation, a pivot mechanism, not shown in the drawings, pivots the guide bar 12 out from the sawing box 11, while the saw chain 14 that runs around the guide bar 12 at a high speed cuts off a tree trunk that is held fixed in the timber working head. The manner in which the guide bar 12 pivots into and out from the sawing box 11 during cutting is illustrated by the double arrow in FIG. 3.

With reference also to FIG. 3A, the guide bar 12 fixed into a holder 18 that can be pivoted around an axis of rotation A such that the guide bar 12 can pivot into and out from the sawing box 11 as has been described above, whereby the pivoting motion can be so great in certain cases that it reaches a value of 90°. The saw motor is of hydraulic type and has a shaft that drives, in turn, the driving wheel 16 of the saw chain 14. The driving wheel 16, which is located in a rear part of the sawing box 11, transfers the power from the saw motor to the saw chain 14, which runs forwards around the guide bar 12 to the vicinity of the driving wheel 16. The driving wheel 16 is located at a rear end of the chain 14. The saw chain 14 normally arrives in an essentially straight motion from the guide bar 12 to the vicinity of the driving wheel 16 (motion B) along a side of the guide bar that during a cutting operation interacts actively with the tree trunk, and rotates around the same. The saw chain 14 changes its direction of motion to one that is essentially the opposite, whereby the direction of motion is the opposite on the inactive side of the guide bar, which faces away from a tree trunk during a cutting operation (motion C). The driving wheel 16 is intended to move in a clockwise rotation.

As is made most clear by FIGS. 2 and 3, it may occur that the saw chain 14 breaks during operation. A part of the chain, not shown in the drawings, can in this case be thrown out from the guide bar 12 when a chain part 14A of the broken saw chain impacts an end edge 20 of a rear screen 22 of the sawing box 11 and is broken free through a whiplash effect that arises. The part that is freed from the chain part risks in this case being thrown out from the sawing box 11 at high speed as what is known as a "chain shot". In order to avoid that a broken saw chain 14 is split and forms a chain shot, the present invention comprises a brake means, generally denoted by reference number 30, that is located in so close proximity to the chain drive 16 in a rear part of the sawing box 11 that it can capture the chain part 14A of a broken saw chain 14. The brake means 30 comprises a material that is sufficiently elastic to receive the kinetic energy from the broken chain part 14A to direct away kinetic energy from the chain part and to regain its normal form after it has suffered an impact from the chain part and been deformed by the same.

As is made most clear by the enlargement of detail in FIG. 1, the screen 22 at the rear end of the sawing box 11, in the close proximity of the driving wheel 16, is provided with an indentation 31 whose width or whose gap is oriented in a plane that is perpendicular to the principal plane of the guide bar 12. The "principal plane of the guide bar 12" is here used to denote the plane in which the guide bar 12 is pivoted into and out from the sawing box 11. The indentation 31 is essentially U-shaped or V-shaped and it is limited by two side walls 31A, 31B that can be regarded as essentially opposite each other. The indentation 31 becomes narrower towards its bottom. In order to capture a saw chain 14 that breaks, an energy-absorbing brake means 30 is arranged in the indentation 31. The brake 15 means 30 is sufficiently elastic to receive the kinetic energy from the broken chain, to direct away kinetic energy from the chain and to regain its normal form after it has suffered an impact from the chain and been deformed by the same.

In one execution, the brake means 30 comprises a line (or string) formed from an elastic material, in particular an elastic line 32 of the type that becomes progressively more rigid as the bending of it increases. The elastic line 32 may be arranged in any suitable manner in the sawing box in order to be able to capture a broken saw chain. The elastic line 32 is in the present embodiment located in the vicinity of the driving wheel 16, preferably at a distance of 25-30 mm from the chain when the guide bar is positioned at its most outwardly pivoted position. The elastic line 32 extends perpendicular to the principal plane of motion of the guide bar 12 during cutting. The elastic line 32 can be located in a region in the screen 22 of the sawing box 11 where the saw chain 14 approaches the driving wheel 16. The indentation 31 demonstrates an opening that is located in the vicinity of the driving wheel 16 and that is turned towards the guide bar 12. The indentation 31 forms an opening that is turned towards the part 14A of the saw chain 14 that is returning to the drive.

The elastic line described above that serves as brake means 30 is illustrated in greater detail in FIG. 3. In order to obtain the required properties, the elastic line comprises a core 33 that consists of an elastic material, a fiber reinforcement 34 that has been applied around this, and an outer covering layer 35 of elastic material, whereby the elastic material in the core and in the covering layer consists of synthetic rubber, and whereby the fiber reinforcement 34 consists of material that has poorer bending properties than the elastic material of the core. It is appropriate that the fiber reinforcement 34 be wound in a screw form around the core 33 at a specific angle of reinforcement to the longitudinal axis of the line and to the reinforcement projected perpendicular to it. It is preferable that the fiber reinforcement 34 consist of cords or tapes, preferably of polyester material. It is an advantage that the fiber reinforcement 34 include two or more layers. In this case, the layers can be wound in opposing directions. The elastic line 32 has a core of a suitable elastic material, for example EPDM rubber (ethylene propylene diene monomer, M-class, rubber). The elastic line can be provided with an outer shell of elastic material with particularly good resistance to weather, UV light and chemicals. A suitable elastic line can consist of a core of styrene butadiene rubber with a hardness of 75° IRH and it can demonstrate a diameter of 15 mm, comprising a screw-wound reinforcement consisting of threads of polyester cord with a suitable angle of reinforcement. The number of threads of polyester cord may be freely chosen, for example 24, and the threads are to be wound close to each other. Through selection of suitable curvatures for different angles of reinforcement, and curvatures that vary in accordance with this, the elastic line can acquire varying degrees of progression of the resistance of the line to bending, and the elastic line can in this way be adapted to capture a part 14A of a broken saw chain 14 in as flexible as manner as is necessary to ensure that there is no risk that it splits and forms "chain shots".

As is shown in FIG. 3, the elastic line 32 is fixed in a manner that is not shown in detail at its ends such that it extends across the indentation 31 in the rear screen 22 of the sawing box 11. The locations of the indentation 31 and the elastic line 32 relative to the pivot mechanism of the guide bar have been selected such that the elastic line forms a fictive contact or an end section of the sawing box that can be said to limit the maximal pivoting motion of the guide bar 12 out from the sawing box, even if the parts are not intended to come into contact with each other.

In the event of a chain break, the brake means 30 will receive a broken part 14A of a saw chain that may possibly also be falling somewhat downwards in a soft and flexible manner. The part 14A of the saw chain that is under tension and that is subsequently broken continues its motion and impacts upon the brake means 30 and is collected against the same so softly that the chain part 14A is not split. The elastic line 32 receives the kinetic energy from a broken chain 14, directs the away kinetic energy from the chain and regain its normal form after it has suffered an impact from the chain and been deformed by the same.

The present invention is not limited to that which has been described above and shown in the drawings: it can be changed and modified in several different ways within the scope of the innovative concept defined by the attached patent claims.

The invention claimed is:

1. An arrangement for a saw chain, comprising:
   a chain saw having a pivotally-arranged guide bar;
   a sawing box housing the chain saw and comprising a screen, the screen being rigid and covering a portion of the chain saw; and
   a brake member coupled to the screen and being located between an end portion of the screen and the pivotally-arranged guide bar of the chain saw so that an open space exists between the brake member and the end portion,
   wherein the brake member comprises an elastic or flexible material that upon impact deforms and absorbs kinetic energy from a saw chain broken during operation of the chain saw.

2. The arrangement claim 1, wherein the screen comprises an indentation partially defined by the end portion and configured to be orientated towards the guide bar, and the brake member is located in the indentation and is configured to form a fictive contact for the guide bar when the guide bar is pivoted away from the sawing box.

3. The arrangement of claim 2, wherein the indentation comprises a width or a gap, and the screen is configured to cover the portion of the chain saw so that the width or the gap is oriented in a plane that is perpendicular to a principal plane of the guide bar in which the guide bar extends.

4. The arrangement of claim 2, wherein the screen further comprises two opposing side edges that further define the indentation and the brake member extends transversely across the indentation and is coupled to each of the two side edges.

5. The arrangement claim 1, wherein the brake member is configured to be located at a region in said screen that is in proximity to a driving wheel for the saw chain.

6. The arrangement of claim 1, wherein the brake member is configured to be oriented to extend perpendicular to a principal plane of the guide bar in which the guide bar extends.

7. The arrangement claim 1, wherein the elastic or flexible material of the brake member becomes progressively more rigid with an increasing degree of bending or degree of curvature.

8. The arrangement of claim 1, wherein the elastic material of the brake member is defined by a core of elastic material, a reinforcement wound in the form of a screw and consisting of threads of polyester cord, and an outer shell of elastic material.

9. The arrangement of claim 1, wherein the brake member comprises a line of elastic material.

10. The arrangement claim 1, wherein the elastic or flexible material is made of rubber or synthetic rubber.

11. The arrangement of claim 10, wherein the synthetic rubber is of EPDM-type.

12. A harvester to be supported by a forestry machine, comprising the arrangement of claim 1.

* * * * *